United States Patent
Wu

(10) Patent No.: US 11,018,990 B2
(45) Date of Patent: May 25, 2021

(54) ROUTE PRIORITY CONFIGURATION METHOD, DEVICE, AND CONTROLLER

(71) Applicant: HUAWEI TECHNOLOGIES CO., LTD., Shenzhen (CN)

(72) Inventor: Guangrui Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/562,644

(22) Filed: Sep. 6, 2019

(65) Prior Publication Data

US 2020/0007465 A1 Jan. 2, 2020

Related U.S. Application Data

(63) Continuation of application No. PCT/CN2018/076748, filed on Feb. 13, 2018.

(30) Foreign Application Priority Data

Mar. 9, 2017 (CN) .......................... 201710138672.2

(51) Int. Cl.
*H04L 12/911* (2013.01)
*H04L 12/24* (2006.01)
(Continued)

(52) U.S. Cl.
CPC ............ *H04L 47/821* (2013.01); *H04L 41/08* (2013.01); *H04L 49/25* (2013.01);
(Continued)

(58) Field of Classification Search
CPC ......... H04L 5/245; H04L 49/25; H04L 45/42; H04L 47/821; H04L 41/08; H04L 45/22;
(Continued)

(56) References Cited

U.S. PATENT DOCUMENTS

| 8,942,085 | B1 | 1/2015 | Pani et al. |
| 2007/0154453 | A1 | 7/2007 | Webster et al. |

(Continued)

FOREIGN PATENT DOCUMENTS

| CN | 1567883 A | 1/2005 |
| CN | 101155118 A | 4/2008 |

(Continued)

OTHER PUBLICATIONS

Xian, Yi et al., "Look-Ahead Routing and Message Scheduling in Delay-Tolerant Networks", 35th Annual IEEE Conference on Local Computer Networks, LCN 2010, Denver, Colorado, 8 pages.

(Continued)

*Primary Examiner* — Brian D Nguyen
(74) *Attorney, Agent, or Firm* — Maier & Maier, PLLC

(57) ABSTRACT

A route priority configuration method, a device, and a controller. The controller receives an interface creation request for creating a layer 3 interface on a target device, where the interface creation request carries an IP address and a subnet mask. The controller generates a direct route of the layer 3 interface based on the interface creation request; allocates a route priority to the direct route according to a preset allocation rule; and sends the direct route and the route priority corresponding to the direct route to the target device. According to the embodiments, direct routes generated based on a same IP address can correspond to different route priorities, to avoid a case in which direct routes advertised by different distributed gateways form ECMP, and improve route priority configuration efficiency.

20 Claims, 6 Drawing Sheets

(51) Int. Cl.
*H04L 12/947* (2013.01)
*H04L 29/12* (2006.01)
*H04L 12/46* (2006.01)
*H04L 12/66* (2006.01)
*H04L 12/707* (2013.01)
*H04L 29/08* (2006.01)

(52) U.S. Cl.
CPC ...... *H04L 61/2007* (2013.01); *H04L 12/4641* (2013.01); *H04L 12/66* (2013.01); *H04L 45/24* (2013.01); *H04L 61/6022* (2013.01); *H04L 69/325* (2013.01)

(58) Field of Classification Search
CPC . H04L 61/2007; H04L 45/24; H04L 61/6022; H04L 12/4641; H04L 69/325; H04L 45/66; H04L 12/66
See application file for complete search history.

(56) References Cited

U.S. PATENT DOCUMENTS

| | | | |
|---|---|---|---|
| 2015/0124586 A1 | 5/2015 | Pani | |
| 2015/0207677 A1 | 7/2015 | Choudhury et al. | |
| 2016/0065385 A1* | 3/2016 | Hwang | G06F 9/45558 370/392 |
| 2016/0366013 A1* | 12/2016 | Akune | H04L 43/08 |
| 2017/0026273 A1 | 1/2017 | Yao et al. | |
| 2017/0026417 A1* | 1/2017 | Ermagan | H04L 63/0272 |
| 2017/0063632 A1 | 3/2017 | Goliya et al. | |
| 2017/0118171 A1* | 4/2017 | Wu | H04L 45/745 |
| 2017/0207992 A1* | 7/2017 | Huang | H04L 43/50 |
| 2017/0310635 A1* | 10/2017 | Yang | H04L 67/10 |
| 2017/0353572 A1* | 12/2017 | Wang | H04L 29/06 |
| 2018/0183860 A1* | 6/2018 | Majumdar | H04L 67/1002 |

FOREIGN PATENT DOCUMENTS

| | | |
|---|---|---|
| CN | 101420382 A | 4/2009 |
| CN | 101827038 A | 9/2010 |
| CN | 101860492 A | 10/2010 |
| CN | 102187628 A | 9/2011 |
| CN | 103152786 A | 6/2013 |
| CN | 103973567 A | 8/2014 |
| CN | 104683208 A | 6/2015 |
| CN | 104702476 A | 6/2015 |
| CN | 105471740 A | 4/2016 |
| CN | 105763512 A | 7/2016 |
| CN | 106034077 A | 10/2016 |
| CN | 106209646 A | 12/2016 |
| CN | 106375231 A | 2/2017 |
| EP | 2685674 A2 | 1/2014 |
| WO | 2016/004874 A1 | 1/2016 |

OTHER PUBLICATIONS

Qiao, Hong et al.,"Distributed fair cooperative routing in multi-gates wireless mesh network", Journal on Communications, vol. 36, No. 2, Feb. 2015, 11 pages including English-language abstract.

* cited by examiner

ROUTE PRIORITY CONFIGURATION METHOD, DEVICE, AND CONTROLLER

CROSS-REFERENCE TO RELATED APPLICATIONS

This application is a continuation of International Application No. PCT/CN2018/076748, filed on Feb. 13, 2018, which claims priority to Chinese Patent Application No. 201710138672.2, filed on Mar. 9, 2017. The disclosures of the aforementioned applications are hereby incorporated by reference in their entireties.

FIELD

The embodiments relate to the field of communications technologies, and in particular, to a route priority configuration method, a device, and a controller.

BACKGROUND

A virtual extensible local area network (VXLAN) is a network virtualization technology. When a device needs to access a virtualized network, a VXLAN gateway is used. The VXLAN gateway may provide packet transmission for the device. To relieve pressure on a single VXLAN gateway and improve forwarding efficiency of the VXLAN gateway, a VXLAN distributed gateway technology is proposed currently. The VXLAN distributed gateway technology refers to that different VXLAN distributed gateways deployed on two or more devices are configured with a same IP address and provide a gateway service at the same time.

All of the VXLAN distributed gateways have the same IP address, and each VXLAN distributed gateway advertises a direct route based on the IP address. Therefore, in a VXLAN distributed gateway scenario, direct routes corresponding to layer 3 interfaces configured on the devices form equal-cost multi-path (ECMP). The direct route is defined relative to a remote route. The direct route is generated by a device based on an IP address of an interface of the device. The remote route is generated based on an IP address of an interface of another device. The ECMP indicates a number of different paths to a same destination IP address or a same destination network segment. The number of paths have same costs. However, because all ECMP occupies hardware resources of a device, ECMP needs to be avoided when the ECMP cannot be used or is not required by a user.

In an existing technical solution, route priorities of direct routes that can form ECMP are manually modified to avoid unnecessary ECMP. However, a workload of modifying the route priorities is relatively heavy, and an error is very likely to occur in a manual modification manner, thereby affecting route priority configuration efficiency.

SUMMARY

Embodiments provide a route priority configuration method, a device, and a controller, so that direct routes generated based on a same IP address can correspond to different route priorities, to avoid a case in which direct routes advertised by different distributed gateways form ECMP, and improve route priority configuration efficiency.

According to a first aspect, an embodiment provides a route priority configuration method. The method is applied to a network system, the network system includes a controller and at least two devices, the at least two devices are deployed with distributed gateways, the distributed gateways on the at least two devices have a same IP address, and any one of the at least two devices is set to a target device. The method includes:
receiving, by the controller, an interface creation request for creating a layer 3 interface on the target device, where the interface creation request carries the IP address and a subnet mask configured for the layer 3 interface; generating a direct route of the layer 3 interface based on the interface creation request; allocating a route priority to the direct route according to a preset allocation rule; and sending the direct route and the route priority corresponding to the direct route to the target device, where the preset allocation rule indicates that a route priority corresponding to a direct route that is based on the IP address and that is of any one of the at least two devices is different from a route priority corresponding to a direct route that is based on the IP address and that is of another device in the at least two devices.

In the first aspect, the route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

With reference to the first aspect, in a first possible implementation of the first aspect, the allocating, by the controller, of a route priority to the direct route according to a preset allocation rule is: generating, based on a device identifier of the target device and according to the preset allocation rule, the route priority corresponding to the direct route, where the device identifier is used to uniquely identify the target device.

With reference to the first aspect, in a second possible implementation of the first aspect, the allocating, by the controller, a route priority to the direct route according to a preset allocation rule is: generating, based on a device identifier of the target device and a preset basic priority and according to the preset allocation rule, the route priority corresponding to the direct route, where the device identifier is used to uniquely identify the target device.

In the first possible implementation of the first aspect and the second possible implementation of the first aspect, the device identifier is used to uniquely identify the target device, and only one layer 3 interface configured with the IP address can be created on the target device. Therefore, the route priority generated according to the preset allocation rule and by using the device identifier can be distinguished from a route priority that is of another device and that is generated by using a device identifier of the another device.

With reference to the first possible implementation of the first aspect or the second possible implementation of the first aspect, in a third possible implementation of the first aspect, before the allocating, by the controller, a route priority to the direct route according to a preset allocation rule, the controller further performs the following operations:
receiving a registration request sent by the target device, where the registration request carries a media access control (MAC) address of the target device; and determining, based on the MAC address of the target device, the device identifier corresponding to the target device. Optionally, the controller may directly determine the MAC address of the target device as the device identifier of the target device. Alternatively, the controller may generate, based on the MAC address of the target device, another device identifier used to uniquely identify the target device. A process of determining the device identifier of the target device is not limited in this embodiment.

According to a second aspect, an embodiment provides a route priority configuration method. The method is applied to a network system, the network system includes a controller and at least two devices, the at least two devices are deployed with distributed gateways, the distributed gateways on the at least two devices have a same IP address, any one of the at least two devices is set to a target device, and the method includes: receiving, by the target device, a direct route and a route priority corresponding to the direct route that are sent by the controller, where the direct route is generated according to a preset allocation rule and based on the IP address and a subnet mask of a layer 3 interface created on the target device; and storing the direct route and the route priority corresponding to the direct route, where the preset allocation rule indicates that a route priority corresponding to a direct route that is based on the IP address and that is of any one of the at least two devices is different from a route priority corresponding to a direct route that is based on the IP address and that is of another device in the at least two devices.

In the second aspect, the route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

With reference to the second aspect, in a first possible implementation of the second aspect, the route priority may be generated based on a device identifier of the target device and according to the preset allocation rule, and the device identifier is used to uniquely identify the target device.

With reference to the second aspect, in a second possible implementation of the second aspect, the route priority may be generated based on a device identifier of the target device and a preset basic priority and according to the preset allocation rule, and the device identifier is used to uniquely identify the target device.

In the first possible implementation of the second aspect and the second possible implementation of the second aspect, the device identifier is used to uniquely identify the target device, and only one layer 3 interface configured with the IP address can be created on the target device. Therefore, the route priority generated according to the preset allocation rule and by using the device identifier can be distinguished from a route priority that is of another device and that is generated by using a device identifier of the another device.

With reference to the first possible implementation of the second aspect or the second possible implementation of the second aspect, in a third possible implementation of the second aspect, before the receiving, by the target device, of a direct route and a route priority corresponding to the direct route that are sent by the controller, the target device further performs the following operation: sending a registration request to the controller, where the registration request carries a MAC address of the target device, and the MAC address of the target device is used to generate the device identifier of the target device.

According to a third aspect, an embodiment provides a controller. The controller is applied to a network system, the network system includes the controller and at least two devices, the at least two devices are deployed with distributed gateways, the distributed gateways on the at least two devices have a same IP address, and the controller includes: a receiving module configured to receive an interface creation request for creating a layer 3 interface on a target device, where the interface creation request carries the IP address and a subnet mask configured for the layer 3 interface, and the target device is any one of the at least two devices; a generation module configured to generate a direct route of the layer 3 interface based on the interface creation request; an allocation module configured to allocate a route priority to the direct route according to a preset allocation rule; and a sending module configured to send the direct route and the route priority corresponding to the direct route to the target device, where the preset allocation rule indicates that a route priority corresponding to a direct route that is based on the IP address and that is of any one of the at least two devices is different from a route priority corresponding to a direct route that is based on the IP address and that is of another device in the at least two devices.

In the third aspect, the route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

With reference to the third aspect, in a first possible implementation of the third aspect, the allocation module is configured to generate, based on a device identifier of the target device and according to the preset allocation rule, the route priority corresponding to the direct route, where the device identifier is used to uniquely identify the target device.

With reference to the third aspect, in a second possible implementation of the third aspect, the allocation module is configured to generate, based on a device identifier of the target device and a preset basic priority and according to the preset allocation rule, the route priority corresponding to the direct route, where the device identifier is used to uniquely identify the target device.

With reference to the first possible implementation of the third aspect or the second possible implementation of the third aspect, in a third possible implementation of the third aspect, the controller further includes a determining module, where the receiving module is further configured to receive a registration request sent by the target device, where the registration request carries a MAC address of the target device; and the determining module is configured to determine, based on the MAC address of the target device, the device identifier corresponding to the target device.

According to a fourth aspect, an embodiment provides a device. The device is a target device in a network system, the network system includes a controller and at least two devices, the at least two devices are deployed with distributed gateways, the distributed gateways on the at least two devices have a same IP address, the target device is any one of the at least two devices, and the device includes:

a receiving module, configured to receive a direct route and a route priority corresponding to the direct route that are sent by the controller, where the direct route is generated according to a preset allocation rule and based on the IP address and a subnet mask of a layer 3 interface created on the target device; and a storage module, configured to store the direct route and the route priority corresponding to the direct route, where the preset allocation rule indicates that a route priority corresponding to a direct route that is based on the IP address and that is of any one of the at least two devices is different from a route priority corresponding to a direct route that is based on the IP address and that is of another device in the at least two devices.

In the fourth aspect, the route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

With reference to the fourth aspect, in a first possible implementation of the fourth aspect, the route priority is generated based on a device identifier of the device and according to the preset allocation rule, and the device identifier is used to uniquely identify the device.

With reference to the fourth aspect, in a second possible implementation of the fourth aspect, the route priority is generated based on a device identifier of the device and a preset basic priority and according to the preset allocation rule, and the device identifier is used to uniquely identify the device.

With reference to the first possible implementation of the fourth aspect or the second possible implementation of the fourth aspect, in a third possible implementation of the fourth aspect, the device further includes a sending module, where the sending module is configured to send a registration request to the controller, where the registration request carries a MAC address of the device, and the MAC address of the device is used to generate the device identifier of the device.

According to a fifth aspect, an embodiment provides a controller. A structure of the controller includes a processor and a communications interface. The communications interface and the processor are communicatively connected, and the processor and the communications interface are configured to perform some, or all, procedures of the controller provided in the first aspect. Optionally, the controller may further include a memory. The memory is configured to store application program code or data that is used by the controller to perform the foregoing methods, to implement an action of the controller provided in the first aspect.

According to a sixth aspect, an embodiment provides a computer storage medium. The computer storage medium is configured to store a computer software instruction used by the controller, and the computer storage medium includes a program designed to perform the method in the first aspect.

According to a seventh aspect, an embodiment provides a device. A structure of the device includes a processor and a communications interface. The communications interface and the processor are communicatively connected, and the processor and the communications interface are configured to perform some, or all, procedures of the device provided in the second aspect. Optionally, the device may further include a memory. The memory is configured to store application program code or data that is used by the device to perform the foregoing methods, to implement an action of the device provided in the second aspect.

According to an eighth aspect, an embodiment provides a computer storage medium. The computer storage medium is configured to store a computer software instruction used by the foregoing device, and the computer storage medium includes a program designed to perform the method in the second aspect.

In the embodiments described herein, names of the controller, the device, and the target device are not intended as limits on these devices. In actual implementation, the devices may have other names. All devices fall within the scope of the embodiments of this application and equivalent technologies of this application, provided that functions of the devices are similar to those in this application.

In the embodiments described herein, the controller receives the interface creation request for creating the layer 3 interface on the target device, where the interface creation request carries the IP address of the distributed gateway and the subnet mask configured for the layer 3 interface; the controller generates the direct route of the layer 3 interface based on the interface creation request, and allocates the route priority to the direct route according to the preset allocation rule; and the controller sends, to the target device, the direct route and the route priority corresponding to the direct route. The route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

DESCRIPTION OF EMBODIMENTS

The following describes the embodiments with reference to the accompanying drawings.

Figure 1:
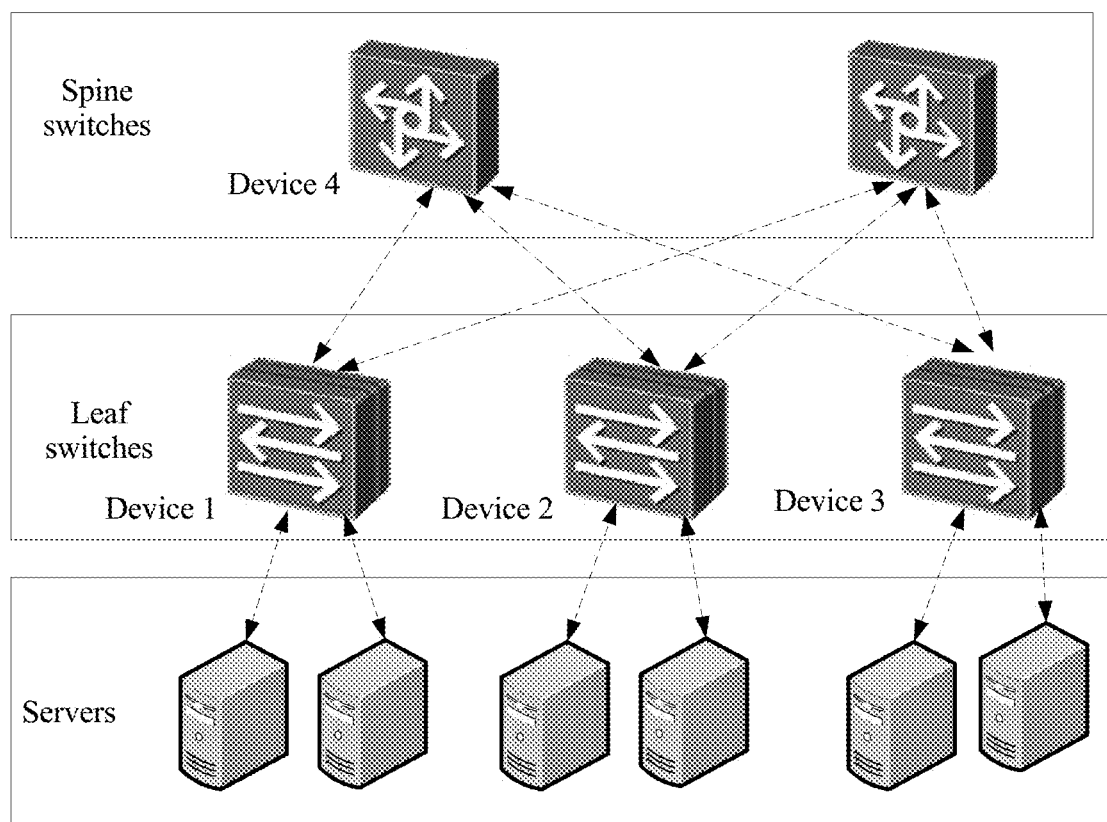
FIG. 1 is a schematic diagram of a possible VXLAN distributed gateway deployment scenario according to an embodiment.

FIG. 1 is a schematic diagram of a possible VXLAN distributed gateway deployment scenario according to an embodiment of the present invention. As shown in FIG. 1, the scenario includes spine switches, leaf switches, and servers. The leaf switch is connected to the server, and the spine switch is connected to the leaf switch. The leaf switches include a device 1, a device 2, and a device 3. A VXLAN distributed gateway is usually deployed on the leaf switch. For example, VXLAN distributed gateways may be deployed on the device 1 and the device 2 in the leaf switches, and IP addresses of the VXLAN distributed gateways each are 192.168.0.1. In this example, there are two paths between any spine switch and a destination address 192.168.0.1. One path is from the spine switch to the device 1, and the other path is from the spine switch to the device 2. The two paths form ECMP. When the ECMP is formed, a spine switch that sends a data packet forwards the data packet through the two paths in a load balancing mode.

However, in a specific packet forwarding scenario, a route is selected based on a longest match principle in terms of a mask length. The mask length indicates a quantity of is included in 32 bits corresponding to a four-byte field that represents a subnet mask. For example, the subnet mask is 255.255.255.0, and therefore, the mask length is 24 bits. In the example shown in FIG. 1, each leaf switch is connected to at least two servers, and provides a communication service for the at least two servers. Therefore, a subnet mask configured for the leaf switch is less than 32 bits. For example, a subnet mask configured for the device 1 in the leaf switches is 255.255.255.0, and therefore a mask length of a direct route corresponding to the device 1 is 24 bits. When a device 4 in the spine switches forwards a packet to the device 1 in the leaf switches, a routing table of the device 4 includes a number of pieces of routing information with different mask lengths, and there is another route whose mask length is greater than the mask length of the direct route. Therefore, the device 4 selects a route with a longest mask length to forward the packet. Therefore, it can be learned that the direct route is not used to forward a specific service, and all ECMP formed by different direct routes that are generated based on a same IP address occupies hardware resources such as memory resources of a device. Consequently, the hardware resources of the device are wasted. In an existing technical solution, to avoid a case in which direct routes form ECMP, route priorities corresponding to the direct routes that can form the ECMP need to be manually modified. However, a workload of modifying the route priorities is heavy, and an error is very likely to occur in a manual modification manner, affecting route priority configuration efficiency.

Figure 2:
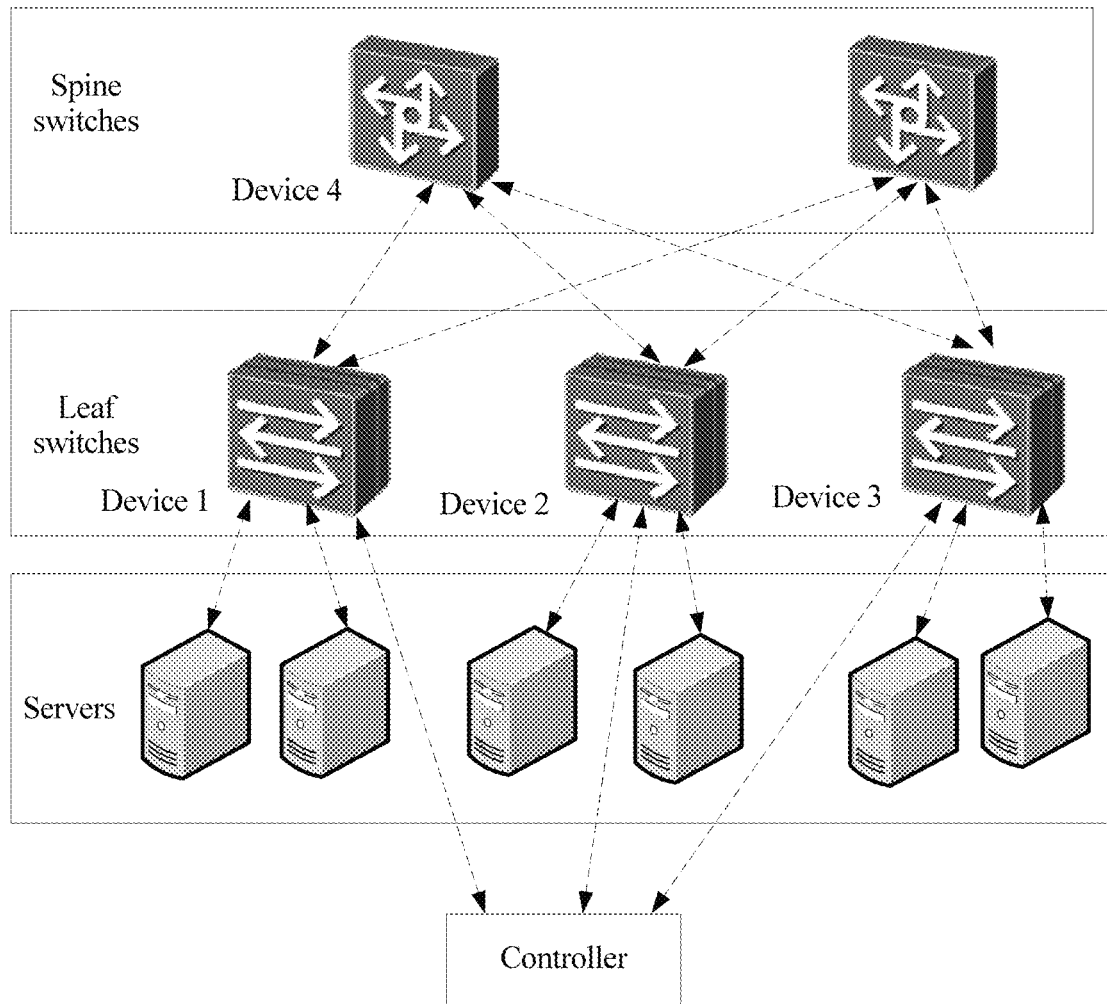
FIG. 2 is a schematic diagram of another possible VXLAN distributed gateway deployment scenario according to an embodiment.

To overcome the foregoing disadvantage, embodiments described herein provide a solution. FIG. 2 is a schematic diagram of another possible VXLAN distributed gateway deployment example according to an embodiment. In the schematic diagram of the scenario shown in FIG. 2, a controller is added based on the schematic diagram of the scenario shown in FIG. 1. The controller may be connected to a leaf switch. Based on the example in FIG. 1, VXLAN distributed gateways may be deployed on a device 1 and a device 2 in leaf switches, and IP addresses of the VXLAN distributed gateways each are 192.168.0.1.

The device 1 is used as an example. The controller receives an interface creation request for creating a layer 3 interface on the device 1, where the interface creation request carries the IP address 192.168.0.1 (namely, the IP addresses of the distributed gateways) and a subnet mask configured for the layer 3 interface; the controller generates a direct route of the layer 3 interface based on the interface creation request; the controller allocates a route priority to the direct route according to a preset allocation rule; and the controller sends the direct route and the route priority corresponding to the direct route to the device 1. When a layer 3 interface with the IP address 192.168.0.1 is created for the device 2, the controller may also complete configuration according to the execution process performed for the device 1, and a route priority allocated to a direct route that is of the device 2 and that is generated based on 192.168.0.1 is different from a route priority allocated to a direct route that is of the device 1 and that is generated based on 192.168.0.1. In this scenario, a factor of a route priority is considered for route selection between any spine switch and the destination address 192.168.0.1, to avoid a case in which different direct routes form ECMP, reduce a workload caused by manually modifying the route priorities, and improve route priority configuration efficiency.

Figure 3:
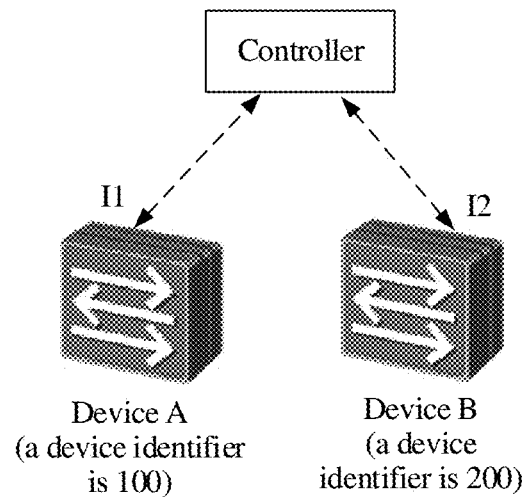
FIG. 3 is an architectural diagram of a possible network system according to an embodiment.

The following describes the embodiments in further detail. FIG. 3 is an architectural diagram of a possible network system according to an embodiment. The network system in FIG. 3 includes a controller, a device A, and a device B. The device A and the device B are deployed with distributed gateways, and the distributed gateways on the device A and the device B have the same IP address. In the architectural diagram of the network system, the controller may directly establish a communication connection to the device A and the device B.

Figure 4:
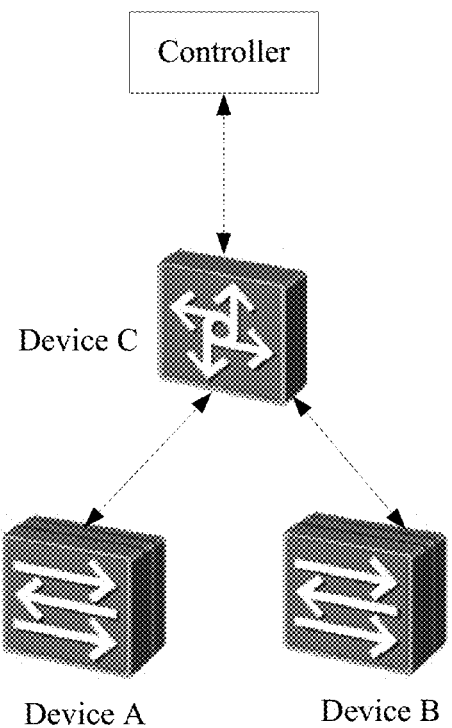
FIG. 4 is an architectural diagram of another possible network system according to an embodiment.

FIG. 4 is an architectural diagram of another possible network system according to an embodiment. The network system in FIG. 4 includes a controller, a device A, a device B, and a device C. The device A and the device B are deployed with distributed gateways, and the distributed gateways on the device A and the device B have the same IP address. In the architectural diagram of the network system, the controller may establish a communication connection to the device A and the device B by using the device C.

In addition to the foregoing network system shown in FIG. 3 or FIG. 4, a route priority configuration method in the embodiments may be applied to another system in which a route priority corresponding to a route needs to be configured, for example, a virtual local area network (VLAN). This is not limited in the embodiments described herein.

A target device or another device in the embodiments may include, but is not limited to, a device that has a routing and transfer function, for example, a router or a switch. A controller may be any device that has a communication function and a management function, for example, a server, a terminal, or a mobile station. Alternatively, a controller may be a mobile phone (or referred to as a "cellular" phone), or may be a portable, pocket-sized, handheld, computer built-in, or in-vehicle mobile apparatus (a smart band, a smartwatch, smart glasses, or the like, as desired).

Figure 5:
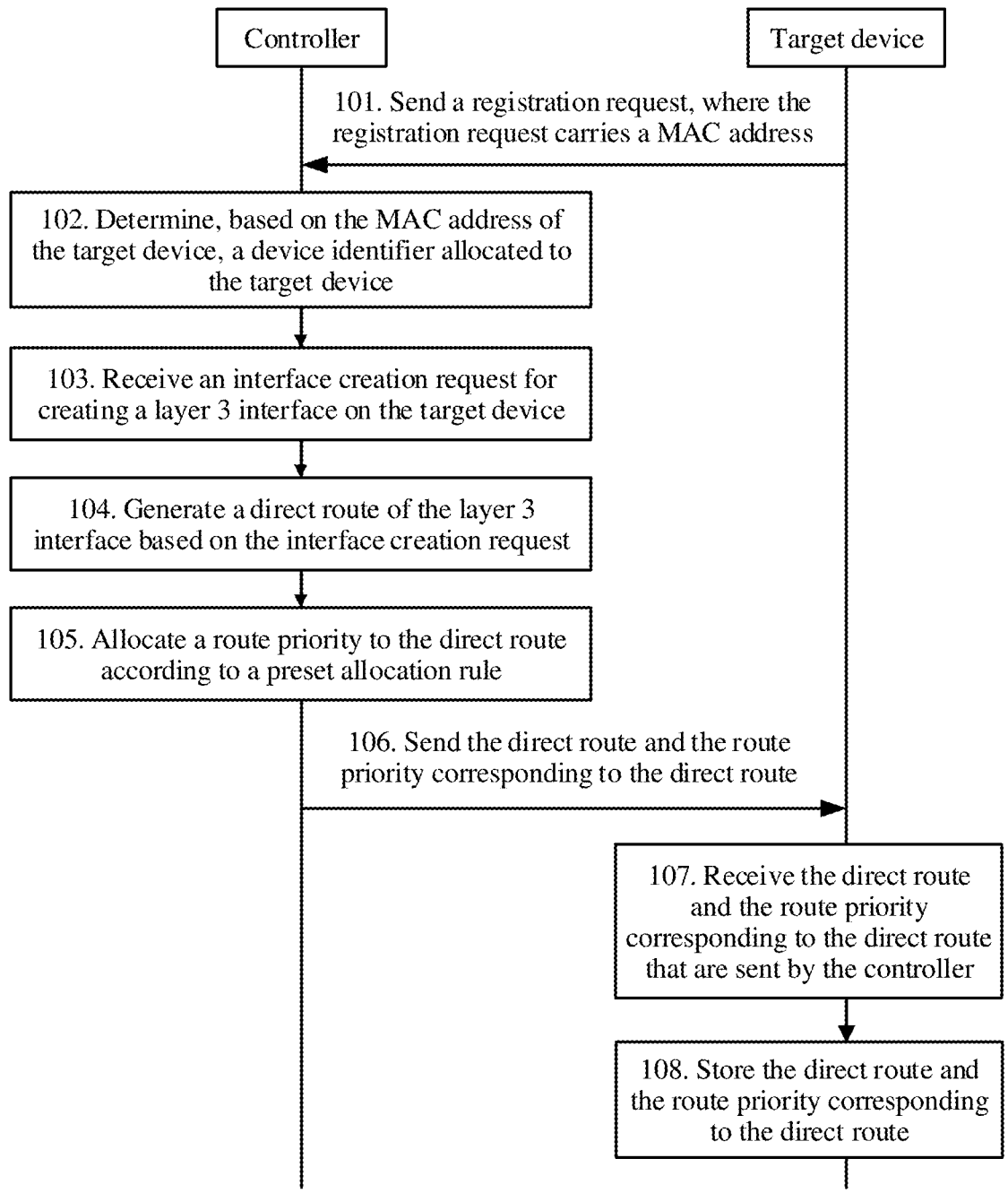
FIG. 5 is a schematic flowchart of a route priority configuration method according to an embodiment.

Further, based on the architectural diagram of the network system shown in FIG. 3 or FIG. 4, FIG. 5 is a schematic flowchart of a route priority configuration method according to an embodiment. The route priority configuration method in this embodiment is jointly performed by a controller and a target device. The target device may be either one of the device A and the device B in the architectural diagram of the network system shown in FIG. 3 or FIG. 4. In addition, the controller and the target device in this embodiment may have other names. All devices fall within the scope of the embodiments and equivalent technologies, provided that functions of the devices are similar to those described herein. For an exemplary process of the route priority configuration method, refer to the following detailed description.

In step 101, the target device sends a registration request to the controller, where the registration request carries a MAC address of the target device.

Optionally, after being powered on, the target device sends the registration request to the controller, and the registration request carries the media access control MAC address of the target device. Because different devices have different MAC addresses, the registration request carries the MAC address, so that the controller can determine a device that sends the registration request.

Optionally, the target device may send the registration request to the controller in a format of a simple network management protocol (SNMP).

Correspondingly, the controller receives the registration request sent by the target device, and verifies the registration request from the target device. For example, the controller verifies whether the MAC address of the target device is valid. After the controller determines that the target device is successfully registered, the controller establishes a communication connection to the target device. Optionally, the controller may establish a communication connection to the target device by using a Network Configuration Protocol (Netconf).

In step 102, the controller determines, based on the MAC address of the target device, a device identifier corresponding to the target device.

Optionally, the controller may directly determine the MAC address of the target device as the device identifier of the target device. Alternatively, the controller may generate, based on the MAC address of the target device, another device identifier used to uniquely identify the target device. A process of determining the device identifier of the target device is not limited in this embodiment of the present invention. Optionally, because the MAC address uses a six-byte (48-bit) identifier, the generated device identifier may be represented by using less than six bytes, to reduce bit resource consumption in a transmission process of the device identifier.

In step 103, the controller receives an interface creation request for creating a layer 3 interface on the target device.

The interface creation request carries an IP address and a subnet mask configured for the layer 3 interface. Creating the layer 3 interface on the target device indicates that the target device is allowed to work at a network layer. The subnet mask is used to determine a network segment within which a data packet may be transmitted by using the layer 3 interface. The IP address carried in the interface creation request is an IP address of the distributed gateway.

Optionally, the interface creation request may be initiated by a user on an operation platform corresponding to the controller, and the IP address and the subnet mask that are carried in the interface creation request may also be configured on the operation platform.

In step 104, the controller generates a direct route of the layer 3 interface based on the interface creation request.

For example, if the IP address of the distributed gateway is 192.168.0.1, the subnet mask configured for the layer 3 interface is 255.255.255.0. Further, the controller may generate the direct route corresponding to the layer 3 interface, which is shown in Table 1.

TABLE 1

| Destination address | Subnet mask | Layer 3 interface |
|---|---|---|
| 192.168.0.1 | 255.255.255.0 | I |

Further, it may be determined, based on the subnet mask, that a server whose IP address falls within 192.168.0.2 to 192.168.0.254 may communicate with a server or a device in another network by using the layer 3 interface.

In step 105, the controller allocates a route priority to the direct route according to a preset allocation rule.

The user may create layer 3 interfaces on a number of devices by using the controller. In an optional solution, layer 3 interfaces created on a same device have different IP addresses, and layer 3 interfaces with a same IP address may be created on different devices. For example, distributed gateways may be deployed on two or more devices (for example, at least two devices).

In this embodiment, the preset allocation rule indicates that a route priority corresponding to a direct route that is based on the IP address of the distributed gateway and that is of any one of the at least two devices is different from a route priority corresponding to a direct route that is based on the IP address of the distributed gateway and that is of another device in the at least two devices. In this case, direct routes generated based on a same IP address correspond to different route priorities. Therefore, a path to a destination IP address may be determined by considering a parameter of the route priority. For example, a path with a highest route priority is selected as the path to the destination IP address. According to the solution of this embodiment, generation of unnecessary ECMP can be reduced, thereby saving a hardware resource occupied due to forming of the ECMP.

In an optional solution, the controller may generate, based on the device identifier of the target device and according to the preset allocation rule, the route priority corresponding to the direct route. The device identifier is used to uniquely identify the target device, and only one layer 3 interface configured with the IP address can be created on the target device. Therefore, the route priority generated according to the preset allocation rule and by using the device identifier can be distinguished from a route priority that is of another device and that is generated by using a device identifier of the another device.

For example, description is provided with reference to the architectural diagram of the network system shown in FIG. 3. The distributed gateways are deployed on the device A and the device B, and the controller may establish a communication connection to the device A and the device B. The user may create, on the device A by using the controller, a layer 3 interface I1 whose IP address is 192.168.0.1 and subnet mask is 255.255.255.0; and may create, on the device B, a layer 3 interface I2 whose IP address is 192.168.0.1 and subnet mask is 255.255.255.0. A device identifier of the device A is 100, and a device identifier of the device B is 200.

Optionally, the controller may generate, based on a preset algorithm, route priorities of direct routes that are of the device A and the device B and that are generated based on the IP address 192.168.0.1. For example, the device identifier 100 is directly determined as a route priority corresponding to a direct route that is of the device A and that is generated based on the IP address 192.168.0.1; or the device identifier 100 is increased by a fixed offset, for example, 1, and 101 is determined as a route priority corresponding to a direct route that is the device A and that is generated based on the IP address 192.168.0.1. The preset algorithm is not limited in this embodiment. Similarly, for the device B, a route priority of a direct route generated based on the IP address 192.168.0.1 may also be generated based on the device identifier of the device B. For example, routing information that includes the direct route and the priority corresponding to the direct route and that corresponds to the layer 3 interface I1 is configured in the device A as shown in Table 2; and routing information corresponding to the layer 3 interface I2 is configured in the device B as shown in Table 3.

TABLE 2

| Destination address | Subnet mask | Route priority | Layer 3 interface |
|---|---|---|---|
| 192.168.0.1 | 255.255.255.0 | 101 | I1 |

TABLE 3

| Destination address | Subnet mask | Route priority | Layer 3 interface |
|---|---|---|---|
| 192.168.0.1 | 255.255.255.0 | 201 | I2 |

Optionally, the controller may generate, based on the device identifiers, a preset basic priority, the preset allocation rule, and a preset algorithm, route priorities of direct routes that are of the device A and the device B and that are generated based on the IP address 192.168.0.1. For example, the preset basic priority is 2. Therefore, the device identifier 100 of the device A is added to the preset basic priority 2, to obtain a route priority 102 of a direct route that is of the device A and that is generated by using the IP address 192.168.0.1; and the device identifier 200 of the device B is added to the preset basic priority 2, to obtain a route priority 202 of a direct route that is of the device B and that is generated by the IP address 192.168.0.1. The preset algorithm is not limited in this embodiment. However, direct routes that are of different devices and that are generated based on a same IP address correspond to different route priorities. Further, optionally, the basic priority may be used to set a default route priority of another route generated for the target device or another device.

In another example, for the device A and the device B on which the distributed gateways are deployed in the architectural diagram of the network system shown in FIG. 4, route priorities of direct routes that are of the device A and the device B and that are generated based on the IP address 192.168.0.1 may be separately determined based on content described in the architectural diagram of the network system shown in FIG. 3. For the sake of brevity, details are not described herein again.

In step 106, the controller sends, to the target device, the direct route and the route priority corresponding to the direct route.

In step 107, the target device receives the direct route and the route priority corresponding to the direct route that are sent by the controller.

In step 108, the target device stores the direct route and the route priority corresponding to the direct route.

For example, after the controller allocates the route priority to the direct route of the target device, the controller sends the direct route and the route priority corresponding to the direct route to the target device. Correspondingly, the target device receives the direct route and the route priority corresponding to the direct route that are sent by the controller, and stores the direct route and the route priority corresponding to the direct route that are received.

Optionally, the target device adds routing information that includes the direct route and the priority corresponding to the direct route to a routing table of the target device, and may notify a neighboring device of the added routing information. The neighboring device is another device that establishes a communication connection to the target device. In this way, the neighboring device may add, to a routing table of the neighboring device, the routing information added by the target device.

Based on the schematic diagram of the gateway deployment shown in FIG. 2, the controller separately creates, on the device 1 and the device 2, layer 3 interfaces whose IP addresses are 192.168.0.1 and subnet masks are 255.255.255.0. A layer 3 interface on the device 1 is IL and a layer 3 interface on the device 2 is I2. The controller sends, to the device 1, a direct route 1 of the layer 3 interface created on the device 1 and a route priority 100 corresponding to the direct route 1; and sends, to the device 2, a direct route 2 of the layer 3 interface created on the device 2 and a route priority 200 corresponding to the direct route 2. The device 1 and the device 2 also notify a neighboring device of newly added routing information (the direct route 1 and the direct route 2). For example, the device 4 in spine switches receives the routing information notified by the device 1 and the device 2, and stores the routing information in a routing table of the device 4. For example, routing information shown in Table 4 exists in the routing table of the device 4.

TABLE 4

| Destination address | Subnet mask | Route priority | Layer 3 interface |
|---|---|---|---|
| 192.168.0.1 | 255.255.255.0 | 100 | I1 |
| 192.168.0.1 | 255.255.255.0 | 200 | I2 |

For the device 4, if the device 4 needs to access the destination address 192.168.0.1, no ECMP is formed because the direct route 1 and the direct route 2 have different route priorities. If a route priority with a larger specified value is higher, it can be learned that the route priority of the direct route 2 corresponding to the layer 3 interface I2 is higher than the route priority of the direct route 1 corresponding to the layer 3 interface I1. A routing policy is selecting a route with a higher priority, and therefore, the device 4 may select the direct route 2 to access 192.168.0.1.

In this embodiment, the controller receives the interface creation request for creating the layer 3 interface on the target device, where the interface creation request carries the IP address and the subnet mask configured for the layer 3 interface; the controller generates the direct route of the layer 3 interface based on the interface creation request; the controller allocates the route priority to the direct route according to the preset allocation rule; and the controller sends, to the target device, the direct route and the route priority corresponding to the direct route. According to this embodiment, the route priority is allocated by using the preset allocation rule, to ensure that different direct routes generated based on a same IP address correspond to different route priorities, thereby avoiding a case in which the different direct routes form ECMP, reducing a workload caused by manually modifying the route priorities, and improving route priority configuration efficiency.

Figure 6:
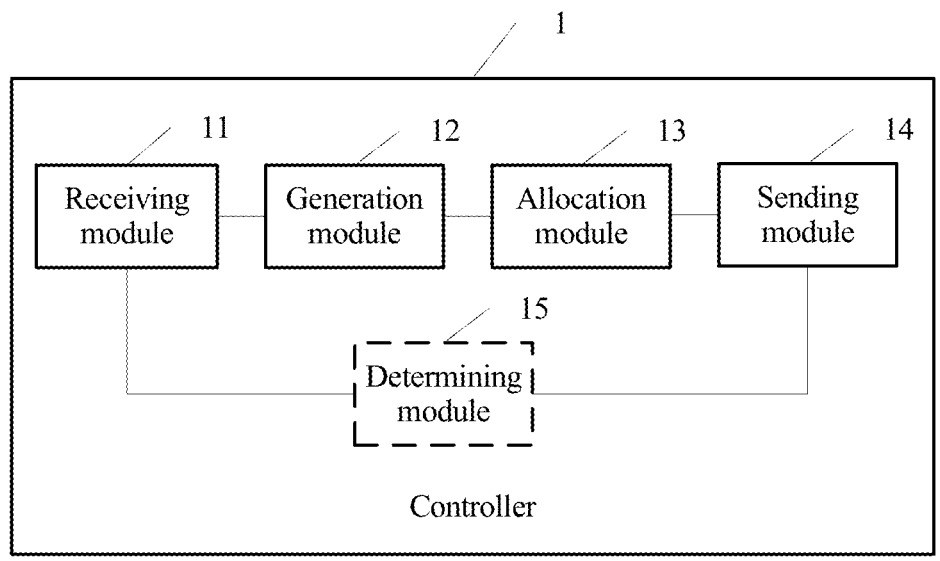
FIG. 6 is a schematic structural diagram of a controller according to an embodiment.

FIG. 6 is a schematic structural diagram of a controller according to an embodiment. The controller is configured to implement the route priority configuration method disclosed in the embodiments. The controller is applied to a network system, and the network system includes the controller and at least two devices. The at least two devices are deployed with distributed gateways, and the distributed gateways on the at least two devices have a same IP address. As shown in FIG. 6, a controller 1 provided in this embodiment may include a receiving module 11, a generation module 12, an allocation module 13, and a sending module 14.

The receiving module 11 is configured to receive an interface creation request for creating a layer 3 interface on a target device. The interface creation request carries the IP address and a subnet mask configured for the layer 3 interface, and the target device is any one of the at least two devices.

The generation module 12 is configured to generate, a direct route of the layer 3 interface based on the interface creation request.

The allocation module 13 is configured to allocate a route priority to the direct route according to a preset allocation rule.

The sending module 14 is configured to send, to the target device, the direct route and the route priority corresponding to the direct route.

The preset allocation rule indicates that a route priority corresponding to a direct route that is based on the IP address and that is of any one of the at least two devices is different from a route priority corresponding to a direct route that is based on the IP address and that is of another device in the at least two devices.

In an optional embodiment, the allocation module 13 is configured to generate, based on a device identifier of the target device and according to the preset allocation rule, the route priority corresponding to the direct route. The device identifier is used to uniquely identify the target device.

In an optional embodiment, the allocation module 13 is configured to generate, based on a device identifier of the target device and a preset basic priority and according to the preset allocation rule, the route priority corresponding to the direct route. The device identifier is used to uniquely identify the target device.

In an optional embodiment, the controller further includes a determining module 15.

The receiving module 11 is further configured to receive a registration request sent by the target device. The registration request carries a media access control MAC address of the target device.

The determining module 15 is configured to determine, based on the MAC address of the target device, the device identifier corresponding to the target device.

Figure 7:
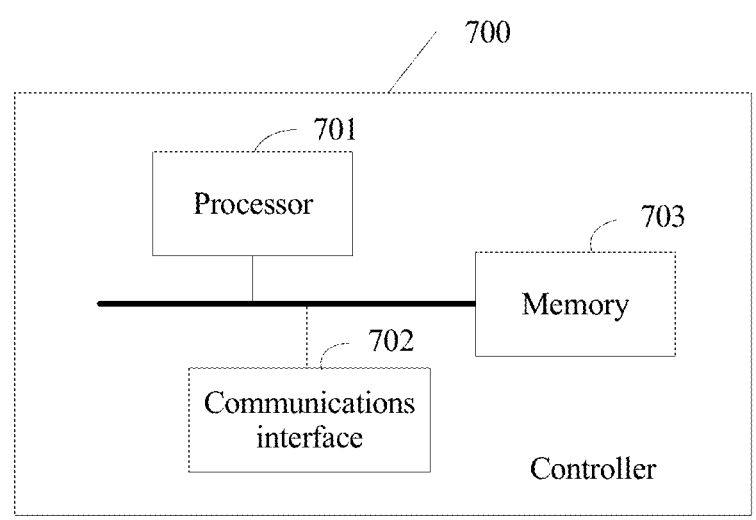
FIG. 7 is a schematic structural diagram of another controller according to an embodiment.

The controller in the embodiment shown in FIG. 6 may be implemented by using a controller shown in FIG. 7. FIG. 7 is a schematic structural diagram of another controller according to an embodiment. A controller 700 shown in FIG. 7 includes a processor 701 and a communications interface 702. The communications interface 702 is configured to support communication between the controller 700 and the at least two devices on which the distributed gateways are deployed in the foregoing embodiments. The processor 701 and the communications interface 702 are communicatively connected, for example, by using a bus. The controller 700 may further include a memory 703. The memory 703 is configured to store program code and data that are executed by the controller 700, to implement an action of the controller provided in any one of the embodiments shown in FIGS. 2-5.

The processor 701 is applied to this embodiment and is configured to implement functions of the generation module 12, the allocation module 13, and the determining module 15 shown in FIG. 6. The communications interface 702 is applied to this embodiment and is configured to implement functions of the receiving module 11 and the sending module 14 shown in FIG. 6.

The processor 701 may be a central processing unit (CPU), a network processor, a hardware chip, or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 703 may include a volatile memory, for example, a random access memory (RAM). Alternatively, the memory 703 may include a nonvolatile memory, for example, a read-only memory (ROM), a flash memory, a hard disk (HDD), or a solid state drive (SSD). Alternatively, the memory 703 may include a combination of the foregoing types of memories, as desired.

Another embodiment further provides a computer storage medium. The computer storage medium is configured to store a computer software instruction used by the foregoing controller. The computer storage medium includes a program designed for the controller to execute the foregoing aspects.

Figure 8:
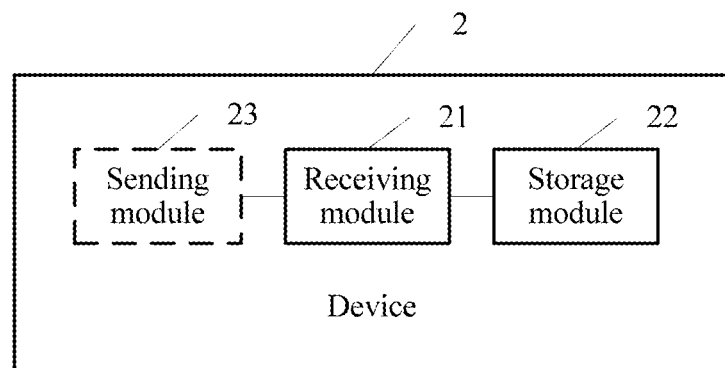
FIG. 8 is a schematic structural diagram of a device according to an embodiment.

FIG. 8 is a schematic structural diagram of a device according to an embodiment. The device is configured to implement the route priority configuration method disclosed in the embodiments described herein. The device is a target device in a network system, and the network system includes a controller and at least two devices. The at least two devices are deployed with distributed gateways, and the distributed gateways on the at least two devices have a same IP address. The target device is any one of the at least two devices. As shown in FIG. 8, a device 2 in this embodiment may include a receiving module 21 and a storage module 22.

The receiving module 21 is configured to receive a direct route and a route priority corresponding to the direct route that are sent by the controller. The direct route is generated according to a preset allocation rule and based on the IP address and a subnet mask of a layer 3 interface created on the target device.

The storage module 22 is configured to store the direct route and the route priority corresponding to the direct route.

The preset allocation rule indicates that a route priority corresponding to a direct route that is based on the IP address and that is of any one of the at least two devices is different from a route priority corresponding to a direct route that is based on the IP address and that is of another device in the at least two devices.

In an optional embodiment, the route priority is generated based on a device identifier of the device and according to the preset allocation rule, and the device identifier is used to uniquely identify the device.

In an optional embodiment, the route priority is generated based on a device identifier of the device and a preset basic priority and according to the preset allocation rule, and the device identifier is used to uniquely identify the device.

In an optional embodiment, the device further includes a sending module 23.

The sending module 23 is configured to send a registration request to the controller. The registration request carries a MAC address of the device, and the MAC address of the device is used to generate the device identifier of the device.

Figure 9:
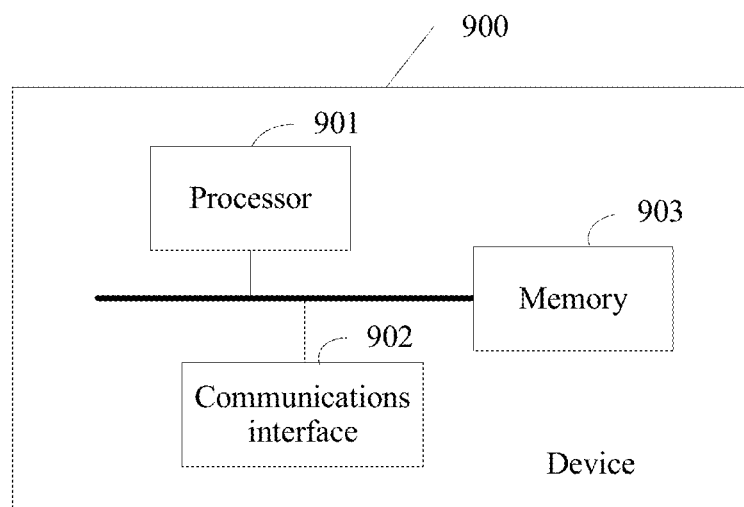
FIG. 9 is a schematic structural diagram of another device according to an embodiment.

The device in the embodiment shown in FIG. 8 may be implemented by using a device shown in FIG. 9. FIG. 9 is a schematic structural diagram of a device according to an embodiment. A device 900 shown in FIG. 9 includes a processor 901 and a communications interface 902. The communications interface 902 is configured to support transmission of communications information between the device 900 and the controller in the foregoing embodiments. The processor 901 and the communications interface 902 are communicatively connected, for example, by using a bus. The device 900 may further include a memory 903. The memory 903 is configured to store program code and data that are executed by the device 900, to implement an action of the target device provided in any one of the embodiments shown in FIGS. 2-5.

The processor 901 is applied to this embodiment and is configured to implement a function of the storage module 22 shown in FIG. 8. The communications interface 902 is applied to this embodiment and is configured to implement functions of the receiving module 21 and the sending module 23 shown in FIG. 8.

The processor 901 may be a CPU, a network processor, a hardware chip, or any combination thereof. The hardware chip may be an ASIC, a PLD, or a combination thereof. The PLD may be a CPLD, an FPGA, GAL, or any combination thereof.

The memory 903 may include a volatile memory, for example, a RAM. Alternatively, the memory 903 may include a nonvolatile memory, for example, a ROM, a flash memory, an HDD, or an SSD. Alternatively, the memory 903 may include a combination of the foregoing types of memories.

Another embodiment further provides a computer storage medium. The computer storage medium is configured to store a computer software instruction used by the foregoing device. The computer storage medium includes a program designed for the device to execute the foregoing aspects.

A person of ordinary skill in the art may understand that all or some of the processes of the method in the embodiments may be implemented by a computer program instructing related hardware. The program may be stored in a computer readable storage medium. When the program runs, the processes of the method in the embodiments are performed. The storage medium may be a magnetic disk, an optical disc, a ROM, a RAM, or the like. What are disclosed above are merely example embodiments and are not intended to limit the protection scope of the present invention.

What is claimed is:

1. A route priority configuration method, the method applied to a network system comprising a controller and at least two devices, the at least two devices deployed with distributed gateways, and the distributed gateways on the at least two devices have a same IP address, the method comprising:
    receiving, by the controller, an interface creation request for creating a layer 3 interface on a target device, wherein the interface creation request carries the IP address and a subnet mask configured for the layer 3 interface, and the target device is any one of the at least two devices;
    generating, by the controller, a direct route of the layer 3 interface based on the interface creation request;
    allocating, by the controller, a route priority to the direct route according to a preset allocation rule; and
    sending, by the controller, the direct route and the route priority corresponding to the direct route to the target device, wherein
    the preset allocation rule indicates that a route priority corresponding to a direct route that is based on the IP address and that is of any one of the at least two devices is different from a route priority corresponding to a direct route that is based on the IP address and that is of another device in the at least two devices,
    wherein the controller identifies each of the at least two devices by predetermined factors including a media access control (MAC) address.

2. The method according to claim 1, wherein the allocating, by the controller, of the route priority to the direct route according to a preset allocation rule comprises:
    generating, by the controller based on a device identifier of the target device and according to the preset allocation rule, the route priority corresponding to the direct route, wherein the device identifier is used to uniquely identify the target device.

3. The method according to claim 2, wherein before the allocating, by the controller, of the route priority to the direct route according to a preset allocation rule, the method further comprises:
    receiving, by the controller, a registration request sent by the target device, wherein the registration request carries the media access control (MAC), address of the target device; and
    determining, by the controller based on the MAC address of the target device, the device identifier corresponding to the target device.

4. The method according to claim 1, wherein the allocating, by the controller, of the route priority to the direct route according to a preset allocation rule comprises:
    generating, by the controller based on a device identifier of the target device and a preset basic priority and according to the preset allocation rule, the route priority corresponding to the direct route, wherein the device identifier is used to uniquely identify the target device.

5. The method according to claim 4, wherein before the allocating, by the controller, of the route priority to the direct route according to a preset allocation rule, the method further comprises:
    receiving, by the controller, a registration request sent by the target device, wherein the registration request carries the media access control (MAC), address of the target device; and
    determining, by the controller based on the MAC address of the target device, the device identifier corresponding to the target device.

6. A route priority configuration method, the method applied to a network system comprising a controller and at least two devices, the at least two devices are deployed with distributed gateways, the distributed gateways on the at least two devices have a same IP address, and any one of the at least two devices is set to a target device, the method comprising:
    receiving, by the target device, a direct route and a route priority corresponding to the direct route that are sent by the controller, wherein the direct route is generated according to a preset allocation rule and based on the IP address and a subnet mask of a layer 3 interface created on the target device; and
    storing, by the target device, the direct route and the route priority corresponding to the direct route, wherein
    the preset allocation rule indicates that a route priority corresponding to a direct route that is based on the IP address and that is of any one of the at least two devices is different from a route priority corresponding to a direct route that is based on the IP address and that is of another device in the at least two devices,
    wherein the controller identifies each of the at least two devices by predetermined factors including a media access control (MAC) address.

7. The method according to claim 6, wherein the route priority is generated based on a device identifier of the target device and according to the preset allocation rule, and the device identifier is used to uniquely identify the target device.

8. The method according to claim 7, wherein before the receiving, by the target device, of the direct route and a route priority corresponding to the direct route that are sent by the controller, the method further comprises:
    sending, by the target device, a registration request to the controller, wherein the registration request carries the media access control (MAC) address of the target device, and the MAC address of the target device is used to generate the device identifier of the target device.

9. The method according to claim 6, wherein the route priority is generated based on a device identifier of the target device and a preset basic priority and according to the preset allocation rule, and the device identifier is used to uniquely identify the target device.

10. The method according to claim 9, wherein before the receiving, by the target device, of the direct route and a route priority corresponding to the direct route that are sent by the controller, the method further comprises:
sending, by the target device, a registration request to the controller, wherein the registration request carries the media access control (MAC) address of the target device, and the MAC address of the target device is used to generate the device identifier of the target device.

11. A controller, wherein the controller is applied to a network system, the network system comprising the controller and at least two devices, the at least two devices are deployed with distributed gateways, the distributed gateways on the at least two devices have a same IP address, the controller comprising:
a memory configured to store a computer program;
a processor configured to execute the computer program to:
receive an interface creation request for creating a layer 3 interface on a target device, wherein the interface creation request carries the IP address and a subnet mask configured for the layer 3 interface, and the target device is any one of the at least two devices;
generate a direct route of the layer 3 interface based on the interface creation request;
allocate, a route priority to the direct route according to a preset allocation rule; and
send the direct route and the route priority corresponding to the direct route to the target device, wherein
the preset allocation rule indicates that a route priority corresponding to a direct route that is based on the IP address and that is of any one of the at least two devices is different from a route priority corresponding to a direct route that is based on the IP address and that is of another device in the at least two devices,
wherein the controller identifies each of the at least two devices by predetermined factors including a media access control (MAC) address.

12. The controller according to claim 11, wherein the processor is further configured to execute the computer program to generate, based on a device identifier of the target device and according to the preset allocation rule, the route priority corresponding to the direct route, wherein the device identifier is used to uniquely identify the target device.

13. The controller according to claim 12, wherein the processor is further configured to execute the computer program to:
receive a registration request sent by the target device, wherein the registration request carries the media access control (MAC) address of the target device; and
determine, based on the MAC address of the target device, the device identifier corresponding to the target device.

14. The controller according to claim 11, wherein the processor is further configured to execute the computer program to generate, based on a device identifier of the target device and a preset basic priority and according to the preset allocation rule, the route priority corresponding to the direct route, wherein the device identifier is used to uniquely identify the target device.

15. The controller according to claim 14, wherein the processor is further configured to execute the computer program to:
receive a registration request sent by the target device, wherein the registration request carries the media access control (MAC) address of the target device; and
determine, based on the MAC address of the target device, the device identifier corresponding to the target device.

16. A device, wherein the device is a target device in a network system, the network system comprising a controller and at least two devices, the at least two devices are deployed with distributed gateways, the distributed gateways on the at least two devices have a same IP address, the target device is any one of the at least two devices, and the device comprises:
a memory configured to store a computer program;
a processor configured to execute the computer program to:
receive a direct route and a route priority corresponding to the direct route that are sent by the controller, wherein the direct route is generated according to a preset allocation rule and based on the IP address and a subnet mask of a layer 3 interface created on the target device; and
store the direct route and the route priority corresponding to the direct route, wherein
the preset allocation rule indicates that a route priority corresponding to a direct route that is based on the IP address and that is of any one of the at least two devices is different from a route priority corresponding to a direct route that is based on the IP address and that is of another device in the at least two devices,
wherein the controller identifies each of the at least two devices by predetermined factors including a media access control (MAC) address.

17. The device according to claim 16, wherein the route priority is generated based on a device identifier of the device and according to the preset allocation rule, and the device identifier is used to uniquely identify the device.

18. The device according to claim 17, wherein the processor is further configured to execute the computer program to send a registration request to the controller, wherein the registration request carries the media access control (MAC) address of the device, and the MAC address of the device is used to generate the device identifier of the device.

19. The device according to claim 16, wherein the route priority is generated based on a device identifier of the device and a preset basic priority and according to the preset allocation rule, and the device identifier is used to uniquely identify the device.

20. The device according to claim 19, wherein the processor is further configured to execute the computer program to send a registration request to the controller, wherein the registration request carries the media access control (MAC) address of the device, and the MAC address of the device is used to generate the device identifier of the device.

* * * * *